United States Patent [19]

Wilkinson

[11] Patent Number: 5,027,693
[45] Date of Patent: Jul. 2, 1991

[54] COMBINATION DIAPHRAGM AND VALVE BODY

[75] Inventor: Dennis W. Wilkinson, Niles, Mich.
[73] Assignee: Allied-Signal Inc., Morristown, N.J.
[21] Appl. No.: 440,848
[22] Filed: Nov. 24, 1989
[51] Int. Cl.$^5$ .............................. F01B 19/02
[52] U.S. Cl. ................... 92/97; 92/98 D; 92/99
[58] Field of Search ............ 92/96, 97, 98 R, 98 D, 92/99, 100, 103 F

[56] References Cited

U.S. PATENT DOCUMENTS

| | | | |
|---|---|---|---|
| 3,183,789 | 5/1965 | Stelzer | 92/99 X |
| 3,385,167 | 5/1968 | Wilson et al. | 92/99 X |
| 3,387,540 | 6/1968 | Wilson | 92/99 X |
| 4,050,358 | 9/1977 | Humberstone et al. | 92/103 F |
| 4,339,990 | 7/1982 | Riedel | 92/99 |
| 4,393,749 | 7/1983 | Miyazaki | 92/98 D X |

FOREIGN PATENT DOCUMENTS

3243774 11/1983 Fed. Rep. of Germany .......... 92/99

Primary Examiner—Edward K. Look
Assistant Examiner—George Kapsalas
Attorney, Agent, or Firm—Larry J. Palguta; Ken C. Decker

[57] ABSTRACT

The combination diaphragm and valve body comprises a plastic vacuum booster valve body (32) which has molded integrally therewith via living hinges (34) a plurality of diaphragm arms (36). The diaphragm arms (36) may be disposed initially in a position substantially parallel to a longitudinal axis (A) of said valve body (32). The diaphragm arms (36) are pivoted to a position substantially orthogonal relative to the longitudinal axis (A) of the valve body (32) and ultrasonically welded to the valve body (32). Each of said diaphragm arms (36) includes a plurality of radial openings (38) at a radial end (39) thereof for receiving a metal connection member (40). The metal connection member (40) is snap-fitted into associated radial openings (38) in the diaphragm arms (36), and a diaphragm (50) is compression molded about the valve body (32) and over the surface of the diaphragm arms (36). The diaphragm arms (36) may be manufactured separately and then welded to the valve body (32).

16 Claims, 2 Drawing Sheets

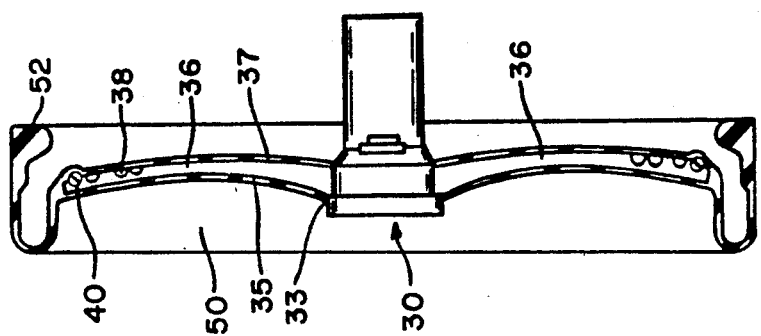
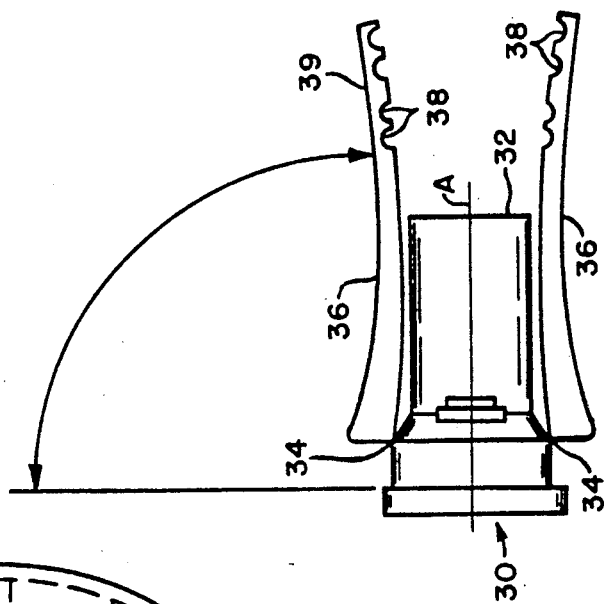
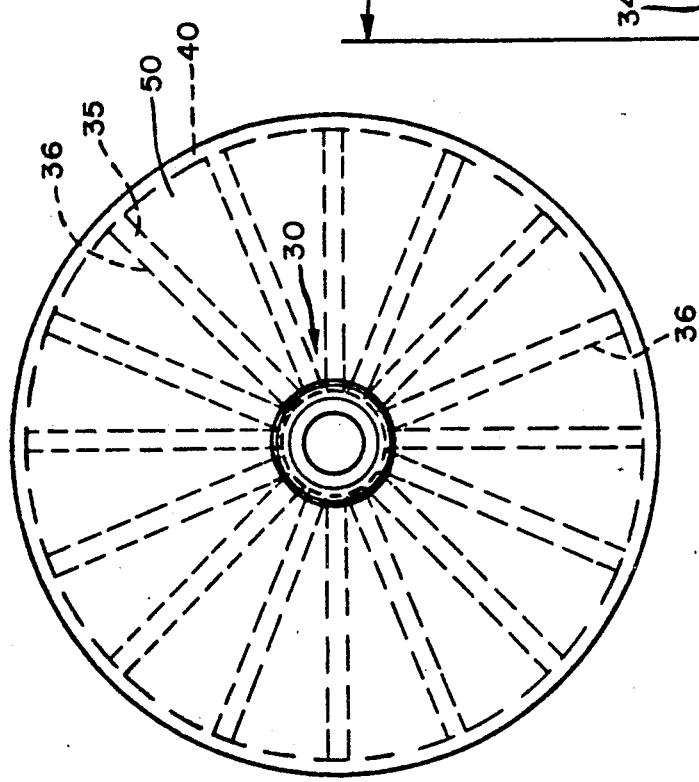

COMBINATION DIAPHRAGM AND VALVE BODY

The present invention relates to a combination diaphragm and valve body, and in particular a combination diaphragm and valve body for use in a vacuum booster assembly.

Vacuum boosters have been utilized for many years in automotive vehicles. Typically, the vacuum booster includes a movable piston which comprises at the center thereof a plastic valve body with a surrounding metal diaphragm plate providing support for a flexible or rubber diaphragm member that extends to an interior surface of the vacuum booster casing. To provide such a vacuum booster, the metal diaphragm plate must be attached to the periphery of the valve body and then the resilient or rubber diaphragm member attached to the periphery of the valve body next to the steel diaphragm plate and also attached to the interior periphery of the booster casing. It is highly desirable to eliminate the steel diaphragm plate in order to reduce the weight and cost of the vacuum booster assembly. It is also highly desirable to provide a diaphragm and valve body construction which will be adjustable to various size vacuum booster assemblies while utilizing only one diaphragm construction which may be altered appropriately.

The present invention provides solutions to the above problems by providing a combination diaphragm and valve body, comprising a plurality of diaphragm arms each connected with a longitudinally extending valve body, the diaphragm arms fixed to the valve body in a substantially orthogonal position, connection means for connecting together said diaphragm arms, and a covering member engaging said valve body and disposed on said diaphragm arms in order to provide an annular member covering said diaphragm arms, the covering member extending beyond a radial periphery of said diaphragm arms.

One way of carrying out the invention is described in detail below with reference to the drawings which illustrate an embodiment in which:

FIG. 2 is a side view of the combination diaphragm and valve body construction of the present invention;

FIG. 3 is an illustration of the combination diaphragm and valve body with the diaphragm arms welded to the valve body and in an orthogonal position; and FIG. 4 is an end view of the combination diaphragm and valve body construction.

Figure 1:
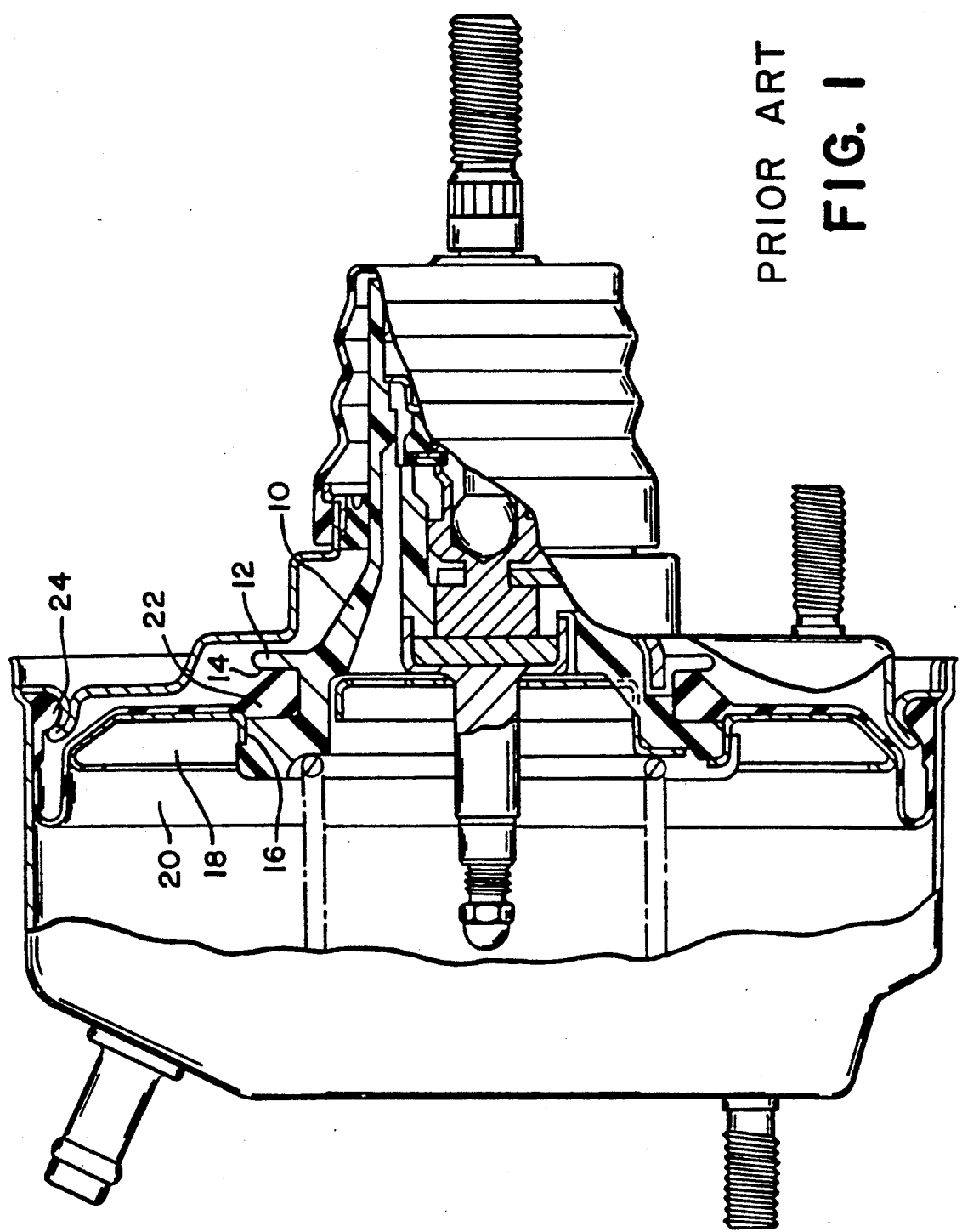
FIG. 1 is an illustration of a typical prior art valve body with steel diaphragm Plate and resilient diaphragm member.

FIG. 1 illustrates a typical prior art valve body, diaphragm plate, and diaphragm construction. The plastic valve body 10 extends along a longitudinal axis and at its radial periphery 12 includes an opening 14 for receiving therein the inner periphery of a resilient diaphragm 20. Valve body radial periphery 12 includes a step 16 which receives the inner periphery of the steel diaphragm plate 18. The resilient diaphragm 20 includes an inner bead 22 received in opening 14, and the diaphragm extends along and covers steel diaphragm plate 18. Diaphragm 20 extends beyond plate 18 to an outer bead 24 which is attached to the interior surface of a booster casing (not shown). The present invention eliminates the need for steel diaphragm plate 18, thereby reducing the weight and cost of a vacuum booster assembly. Additionally, the present invention provides a combination diaphragm and valve body that may be modified and utilized in different booster assemblies.

FIG. 2 illustrates the combination diaphragm support and valve body indicated generally by reference numeral 30. Combination diaphragm support and valve body 30 includes a valve body 32 which may be plastic or metal and made in accordance with well known prior methods. However, when a plastic valve body 32 is molded, there is molded therewith via living hinges 34 a plurality of diaphragm arms 36. Diaphragm arms 36 may be pivoted about body 32 so that they can be disposed either substantially parallel to longitudinal axis A of body 32 or disposed in a position substantially orthogonal relative to body 32. Each arm 36 includes a plurality of radial openings 38 at a radial end 39. The combination valve body 32 and diaphragm arms 36 may be easily and economically shipped when arms 36 are in the parallel position illustrated at FIG. 2. When combination valve body 32 and arms 36 is to be assembled, the arms are first rotated or pivoted to the position orthogonal relative to valve body longitudinal axis A as shown in FIG. 3. Each of the arms is ultrasonically welded in place so that it is in a fixed position perpendicular relative to longitudinal axis A. Next, a metallic ring or connection member 40 may be snap fitted into associated openings 38 at radial ends of arms 36. Depending on the size of the booster assembly to be manufactured, the ring 40, according to its diameter, may be snap fitted into any one of the four radial openings 38 present at each radial end 39 of an arm 36. If ring 40 is snap fitted into one of the radially inner openings 38, then the radially outer portion of each arm 36 may be simply removed by cutting or any other method suitable for removing the outer portion. Next, a rubber diaphragm or covering member 50 is compression molded onto the skeletal surface of the diaphragm arms and valve body. The diaphragm 50 fits tightly about the periphery of valve body central portion 33 and extends over the front and rear sides of diaphragm arms 36 to provide a continuous annular diaphragm covering. Diaphragm 50 extends into radial end 52 which is disposed radially outwardly of the radial ends of arms 36. Each arm 36 includes a front side 35 and a rear side 37, and both of these sides may be covered by diaphragm 50 in order to provide a stronger diaphragm assembly. Alternatively, diaphragm 50 may be molded to just one side of the arms 36. Diaphragm 50 may be molded over the exposed portion of ring 40 when both sides are covered. Also, arms 36 may be metal and manufactured separate from a metallic valve body 32 and then welded to body 32 to provide the arms/body subassembly illustrated in FIG. 3. Thus, the valve body 32 with extended arms 36, snap ring 40 and covering member 50 provide a completed combination diaphragm and valve body subassembly which may be utilized in the further assembly of a vacuum booster assembly.

The present invention provides substantial advantages over the typical prior methods for manufacturing vacuum boosters. The combination diaphragm and valve body does not require the use of a steel diaphragm plate, and utilizes less material which reduces costs. Because the diaphragm arms may be folded to a position substantially parallel with the valve body, the subassembly of the diaphragm arms and valve body may be shipped more easily. Finally, the radial dimension of each diaphragm arm may be adjusted according to the size of the vacuum booster assembly by merely removing the portion of each arm which is radially outwardly of the radial opening which receives the connection member. The final subassembly would have less weight and also enables the utilization of one valve body for different sized boosters.

I claim:

1. A combination diaphragm and valve body, comprising a plurality of diaphragm arms each connected by means of a living hinge with a longitudinally extending valve body, the plurality of diaphragm arms initially displaceable from a position substantially parallel to said valve body to a substantially orthogonal position relative thereto, the diaphragm arms fixed to the valve body in the orthogonal position; connection means for connecting together said diaphragm arms, and a covering member engaging said valve body and disposed on said diaphragm arms in order to provide an annular member covering said diaphragm arms, the covering member extending beyond a radial periphery of said diaphragm arms.

2. The combination diaphragm and valve body in accordance with claim 1, wherein said diaphragm arms are ultrasonically welded to said valve body when the arms are in said orthogonal position.

3. The combination diaphragm and valve body in accordance with claim 2, wherein each diaphragm arm includes oppositely disposed front and rear sides, the covering member extending over both the front and rear sides of the diaphragm arms.

4. The combination diaphragm and valve body in accordance with claim 1, wherein the connection means comprises an annular metal ring member.

5. The combination diaphragm and valve body in accordance with claim 1, wherein said covering member comprises a resilient diaphragm for a vacuum booster.

6. The combination diaphragm and valve body, in accordance with claim 1, wherein each diaphragm arm includes a plurality of openings near a radial periphery thereof, the connection means connected with each diaphragm arm by snapfitting into a respective opening on each diaphragm arm.

7. A method for providing a combination diaphragm and valve body, comprising the steps of (a) providing a valve body with a plurality of diaphragm arms connected by respective living hinges so that the diaphragm arms may be disposed in a position substantially parallel to a longitudinal axis of said valve body, (b) moving said diaphragm arms into a substantially orthogonal position relative to said valve body and fixing said diaphragm arms in said orthogonal position, (c) providing connection means which extends about and connects together said diaphragm arms, and (d) providing a covering member which engages said valve body and extends radially outwardly to provide a continuous covering over said diaphragm arms and which extends beyond radial ends of said diaphragm arms.

8. The method in accordance with claim 7, further comprising the step of removing a portion of the radial end of each of said diaphragm arms at one of prior to and after providing said connecting means to said arms.

9. The method in accordance with claim 8, further comprising the step of providing a plurality of openings in the radial end of each of said diaphragm arms, associated openings in the radial ends receiving said connection means.

10. A combination diaphragm and valve body, comprising a plurality of diaphragm arms each connected with a longitudinally extending valve body, the diaphragm arms ultrasonically welded to the valve body in a substantially orthogonal position, connection means for connecting together said diaphragm arms, and a covering member engaging said valve body and disposed on said diaphragm arms in order to provide an annular member covering said diaphragm arms, the covering member extending beyond a radial periphery of said diaphragm arms.

11. The combination diaphragm and valve body in accordance with claim 10, wherein the connection means comprises an annular metal ring member.

12. A combination diaphragm and valve body, comprising a plurality of diaphragm arms each connected with a longitudinally extending valve body, the diaphragm arms fixed tot he valve body in a substantially orthogonal position, connection means for connecting together said diaphragm arms, and a covering member engaging said valve body and disposed on said diaphragm arms in order to provide an annular member covering said diaphragm arms, each diaphragm arm including oppositely disposed front and rear sides, the covering member extending over both the front and rear sides of the diaphragm arms and extending beyond a radial periphery of said diaphragm arms.

13. The combination diaphragm and valve body in accordance with the claim 12, wherein said covering member comprises a resilient diaphragm for a vacuum booster.

14. A combination diaphragm and valve body, comprising a plurality of diaphragm arms each connected with a longitudinally extending valve body, the diaphragm arms fixed to the valve body in a substantially orthogonal position, connection means for connecting together said diaphragm arms, and a covering member engaging said valve body and disposed on said diaphragm arms in order to provide an annular member covering said diaphragm arms, each diaphragm arm including a plurality of openings near a radial periphery thereof, the connection means connected with each diaphragm arm by snapfitting into a respective opening on each diaphragm arm, and the covering member extending beyond a radial periphery of said diaphragm arms.

15. A method for providing a combination diaphragm and valve body, comprising the steps of (a) providing separately a valve body and a plurality of diaphragm arms that may be disposed in a position substantially orthogonal to a longitudinal axis of said valve body, (b) disposing said diaphragm arms in the substantially orthogonal position relative to said valve body and fixing said diaphragm arms to said valve body, (c) providing connection means which extends about and connects together said diaphragm arms, (d) removing a portion of a radial end of each of said diaphragm arms at one of prior to and after providing said connection means to said arms, and (e) providing a covering member which engages said valve body and extends radially outwardly to provide a continuous covering over said diaphragm arms and which extends beyond the radial ends of said diaphragm arms.

16. The method in accordance with claim 15, further comprising the step of providing a plurality of openings in the radial end of each of said diaphragm arms, associated openings in the radial ends receiving said connection means.

* * * * *